E. S. WOODS, DEC'D.
A. G. WELCH, EXECUTOR.
ANTIFRICTION BEARING.
APPLICATION FILED NOV. 7, 1910.
1,094,957.
Patented Apr. 28, 1914.
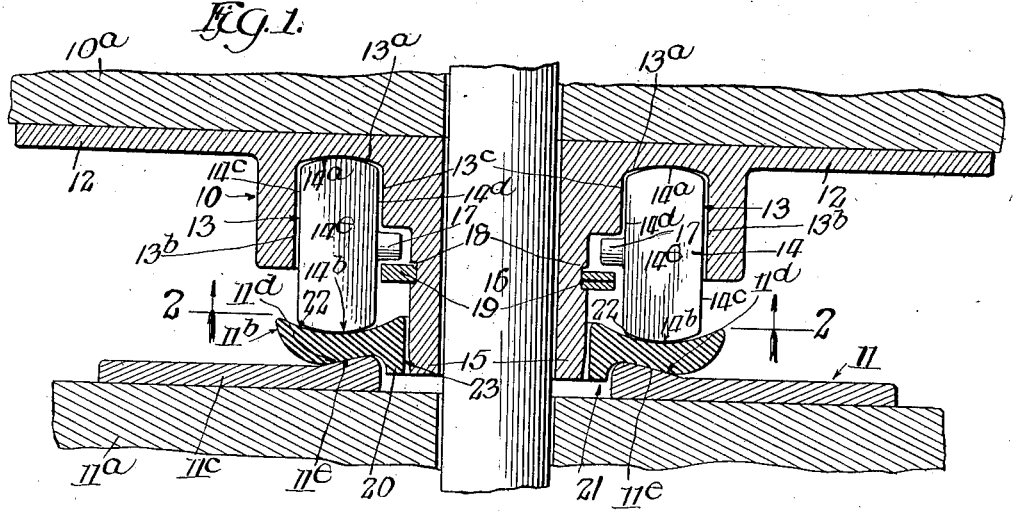
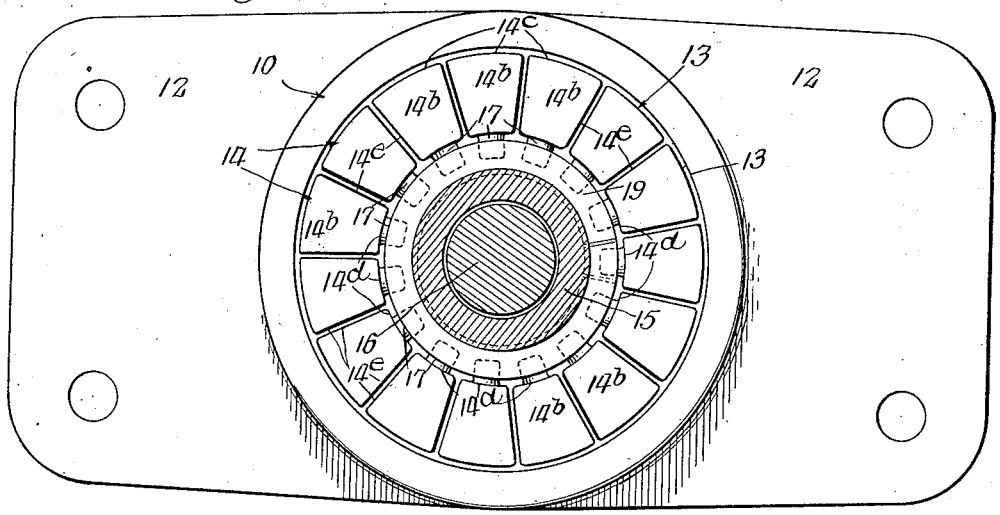
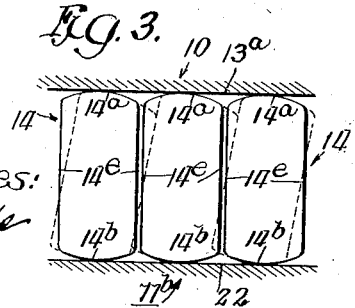
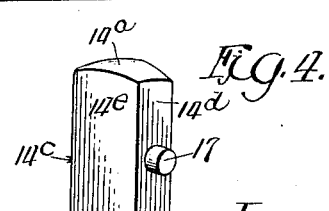
Inventor
Edwin S. Woods
by Poole + Brown
Attys

UNITED STATES PATENT OFFICE.

EDWIN S. WOODS, OF CHICAGO, ILLINOIS; ALBERT G. WELCH EXECUTOR OF SAID WOODS, DECEASED.

ANTIFRICTION-BEARING.

1,094,957. Specification of Letters Patent. Patented Apr. 28, 1914.

Application filed November 7, 1910. Serial No. 591,008.

*To all whom it may concern:*

Be it known that I, EDWIN S. WOODS, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to improvements in antifriction bearings, designed to be interposed between two parts, which are arranged in substantially parallel relation with each other, and which are capable of limited, relative oscillatory movement, in order to transmit a load from one of said parts to the other in such manner as to minimize the friction between the same in the relative oscillation of said parts.

My improved antifriction bearing is particularly adapted for use as a center bearing between the truck and body bolster of a car and in analogous situations, and is herein illustrated and is specifically described as applied to that use.

The present invention relates to the same general type of bearing as that described in an application filed by me on September 3rd, 1907, Serial Number 391,039, but the specific improvement described herein is particularly applicable for use with street cars, where short sharp turns are made by the truck in passing around corners.

My improved bearing embraces upper and lower bearing members which have limited, relative oscillatory movement and which are constructed to form between them an annular chamber containing a series of circularly arranged, closely nested antifriction elements which have rolling contact with said bearing members and oscillatory movement on axes radial to the central vertical axis of oscillation of said bearing members. Each antifriction element has transversely convex bearing surfaces and is flattened or cut away at its sides so that a cross-section through its bearing surfaces at right angles to its axis of oscillation approximates the section of transmission, as described in the application referred to, but the specific type of antifriction element used in the present bearing, and belonging to the genus broadly covered by said prior application, has spherical bearing surfaces.

In the drawings:—Figure 1 is a vertical axial section through a bearing embodying my invention. Fig. 2 is a horizontal section through Fig. 1 on the line 2—2 thereof. Fig. 3 is an end view showing a plurality of adjacent antifriction elements used in the construction shown in Figs. 1 and 2. Fig. 4 is a perspective view of one of the antifriction elements.

10 and 11 indicate the upper and lower bearing members which are secured respectively to the body bolster $10^a$ and truck bolster $11^a$ by bolts or rivets in the ordinary manner. The upper bearing member 10 has an extended apertured flange 12 which engages against the under side of the body bolster $10^a$. Said bearing member has an annular groove 13 on its under side which forms part of the chamber containing the antifriction elements 14. The top wall $13^a$ of the groove 13, which constitutes the bearing surface of the upper bearing member with which the antifriction elements have rolling contact, is transversely concave, the radius of the curvature being slightly greater than that of the bearing surfaces of the antifriction elements. The vertical walls $13^b$, $13^c$ of the grooves are cylindric and inclose the upper ends of the antifriction elements. The upper bearing member is provided with a centrally disposed, apertured hub 15 within which is located the kingbolt 16.

The lower bearing member 11 preferably includes two plates $11^b$, $11^c$, the one bearing upon the other, and the engaging faces $11^d$, $11^e$ being constructed to form a universal bearing. The upper plate $11^b$ has a central depending, annular flange 20 which engages loosely within a circular aperture 21 in the lower plate $11^c$. The upper plate $11^b$ is provided with an annular groove 22 which is transversely concave and which has a curvature of slightly greater radius than that of the curvature of the bearing surfaces of the antifriction elements. The plate $11^b$ has a central aperture 23 to receive the lower end of the hub 15 of the upper bearing member.

Each antifriction element 14 is provided with upper and lower bearing surfaces $14^a$, $14^b$ which are parts of a sphere having its center coincident with the geometric center of the antifriction element. The outer and inner ends $14^c$, $14^d$, respectively, of the antifriction elements are parallel and are formed in curved surfaces extending substantially at right angles to their axes of oscillation.

$14^e$, $14^e$ indicate the flattened or cut away sides of the antifriction element, said sides tapering toward the central axis of the bearing. Each antifriction element is provided on its inner end with a centrally disposed trunnion 17 the central axis of which contains the center of the sphere of which the bearing surfaces $14^a$, $14^b$ form a part.

The hub 15 is provided with an annular groove 18 in which is supported a split ring 19 made of spring metal so as to be readily applied to or removed from the hub. When the bearing is assembled, said ring is located below the trunnions 17 of the antifriction elements in position to support them when said antifriction elements are not supported by the lower bearing member. In such case the antifriction elements are upheld by the ring 19 and the outer wall $13^b$ of the groove 13, which wall is extended down substantially to the level of said ring for this purpose.

The antifriction elements are closely spaced and the cross-section of each through its bearing surface at right angles to its axis of oscillation approximates the section of transmission, as in the application above referred to. By reason of the spherical shape of the bearing surfaces of the antifriction elements the operation of the bearing produces no end thrust of the antifriction elements, such as is produced, for example, in the case of the use of antifriction elements having conical bearing surfaces. The universal bearing between the upper and lower plates of the two-part bearing insures contact of the bearing members with the antifriction elements under all ordinary conditions.

I claim as my invention:—

1. A center bearing comprising relatively oscillatory bearing members and a series of circularly arranged, closely spaced antifriction elements all of which have rolling contact with said bearing members and are adapted to oscillate on axes radial to the axis of oscillation of said bearing members, one of said bearing members having a centrally disposed hub and the other a central aperture within which the end of said hub engages, said last named bearing comprising upper and lower plates, the adjacent faces of which are constructed to form a universal bearing, and the upper plate having a central depending flange engaged loosely within an aperture in the lower plate.

2. A center bearing comprising relatively oscillatory bearing members and an interposed series of antifriction elements, one of said bearing members having a centrally disposed aperture and comprising upper and lower plates, the adjacent faces of which are so constructed to form a universal bearing, and one of said plates being provided with a central flange engaged loosely within an aperture in the other plate.

3. A center bearing comprising relatively oscillatory bearing members and a series of circularly arranged, closely spaced antifriction elements, all of which have rolling contact with said bearing members and are adapted to oscillate simultaneously on axes radial to the axis of oscillation of said bearing members, each antifriction element being provided with a trunnion at its inner end, the upper bearing member being provided with a deep annular groove which partially incloses said antifriction elements and being provided with a central hub which engages with an aperture formed in the lower bearing member, and a split ring engaged within an annular groove on said hub located below the trunnions of said antifriction elements.

4. A center bearing comprising upper and lower, relatively oscillatory bearing members and a series of circularly arranged, closely spaced antifriction elements adapted to oscillate on axes radial to the axis of oscillation of said bearing members, each antifriction element having spherical bearing surfaces, and flattened sides converging toward the central axis of said bearing members, trunnions formed at the inner ends of said antifriction elements, the upper bearing member being provided with a deep groove which partially incloses said antifriction elements, said groove having a transversely curved top wall which forms its bearing face, a central hub rigid with said upper bearing member and projecting into an aperture in said lower bearing member, said hub having an annular shoulder located below the trunnions of said antifriction elements, and the lower bearing member comprising upper and lower plates the adjacent faces of which are constructed to form a universal bearing.

In testimony that I claim the foregoing as my invention I affix my signature in the presence of two witnesses, this 29th day of October, A. D. 1910.

EDWIN S. WOODS.

Witnesses:
GEORGE R. WILKINS,
T. H. ALFREDS.